United States Patent
Chilakamarri et al.

(10) Patent No.: US 10,394,949 B2
(45) Date of Patent: Aug. 27, 2019

(54) DECONSTRUCTING DOCUMENTS INTO COMPONENT BLOCKS FOR REUSE IN PRODUCTIVITY APPLICATIONS

(71) Applicant: Microsoft Technology Licensing, LLC, Redmond, WA (US)

(72) Inventors: Pradeep Chilakamarri, Seattle, WA (US); Bernhard S. J. Kohlmeier, Seattle, WA (US); Bjørn Olstad, Oslo (NO); Ashok Kuppusamy, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 15/087,355

(22) Filed: Mar. 31, 2016

(65) Prior Publication Data
US 2016/0371249 A1 Dec. 22, 2016

Related U.S. Application Data

(60) Provisional application No. 62/182,990, filed on Jun. 22, 2015.

(51) Int. Cl.
*G06F 7/00* (2006.01)
*G06F 17/27* (2006.01)
(Continued)

(52) U.S. Cl.
CPC ........ *G06F 17/2705* (2013.01); *G06F 16/258* (2019.01); *G06F 16/27* (2019.01); *G06F 16/93* (2019.01); *G06F 17/2229* (2013.01)

(58) Field of Classification Search
CPC ............. G06F 17/2705; G06F 17/2229; G06F 17/30575; G06F 17/30569; G06F 17/30011; G06F 8/427
(Continued)

(56) References Cited

U.S. PATENT DOCUMENTS

| | | | |
|---|---|---|---|
| 5,956,736 A | * | 9/1999 | Hanson .................. G06F 17/24 715/234 |
| 6,088,707 A | | 7/2000 | Bates et al. |

(Continued)

FOREIGN PATENT DOCUMENTS

| | | |
|---|---|---|
| WO | 2014028300 A1 | 2/2014 |
| WO | 2015065776 A1 | 5/2015 |
| WO | 2015066657 A1 | 5/2015 |

OTHER PUBLICATIONS

Bosnic, et al., "Automatic Keywords Extraction—a Basis for Content Recommendation", In Proceedings of the Fourth International Workshop on Search and Exchange of E-learning Materials; Sep. 27, 2010; 10 pages.

(Continued)

*Primary Examiner* — Mohammed R Uddin
(74) *Attorney, Agent, or Firm* — Talem IP Law, LLP

(57) ABSTRACT

Documents can be deconstructed into component blocks for reuse in productivity applications using a document shredder. The document shredder can identify specific objects within a source document that are likely to be reused, replicate the objects, and store the objects, or component blocks, separate from the source document. The productivity application can access the objects and present these objects to a user of the productivity application for easy insertion into the user's document. The component blocks, or identified relevant objects can be from document sources of previously generated content from a same or different author than the user of a productivity application.

21 Claims, 14 Drawing Sheets

(51) Int. Cl.
*G06F 16/27* (2019.01)
*G06F 16/93* (2019.01)
*G06F 16/25* (2019.01)
*G06F 17/22* (2006.01)

(58) Field of Classification Search
USPC .............................. 707/803, 805, 771, 754
See application file for complete search history.

(56) References Cited

U.S. PATENT DOCUMENTS

| | | | |
|---|---|---|---|
| 7,143,091 B2 | 11/2006 | Charnock et al. | |
| 7,464,330 B2* | 12/2008 | Bishop | G06F 9/543 715/234 |
| 7,568,184 B1* | 7/2009 | Roth | G06F 8/74 717/123 |
| 7,594,166 B1* | 9/2009 | Ramakrishna | G06F 17/3089 709/203 |
| 7,681,112 B1* | 3/2010 | Francis | G06F 17/2229 715/201 |
| 7,783,967 B1* | 8/2010 | Carnell | G06F 17/3089 715/234 |
| 7,831,601 B2 | 11/2010 | Oral et al. | |
| 7,870,478 B1* | 1/2011 | Chiaro, Jr. | G06F 17/2229 715/223 |
| 7,984,035 B2 | 7/2011 | Levin et al. | |
| 8,046,387 B2 | 10/2011 | Nelson | |
| 8,050,906 B1* | 11/2011 | Zimmerman | G06F 17/2836 704/2 |
| 8,176,466 B2* | 5/2012 | Tristram | G06F 8/36 717/105 |
| 8,352,397 B2 | 1/2013 | Rubin et al. | |
| 8,583,673 B2 | 11/2013 | Tarek et al. | |
| 8,682,989 B2 | 3/2014 | Meisels et al. | |
| 8,914,720 B2 | 12/2014 | Harrington | |
| 8,954,441 B1 | 2/2015 | Baranov et al. | |
| 9,247,021 B1 | 1/2016 | Obbard et al. | |
| 9,703,762 B1* | 7/2017 | Chitale | G06F 17/227 |
| 9,779,063 B1* | 10/2017 | Dykema | G06F 17/211 |
| 2003/0097640 A1 | 5/2003 | Abrams et al. | |
| 2003/0212546 A1* | 11/2003 | Shaw | G06F 17/279 704/9 |
| 2004/0093559 A1 | 5/2004 | Amaru et al. | |
| 2004/0158496 A1 | 8/2004 | Tenorio | |
| 2005/0010896 A1* | 1/2005 | Meliksetian | G06F 17/30917 717/106 |
| 2005/0125728 A1* | 6/2005 | Peiro | G06F 17/2247 715/235 |
| 2006/0136477 A1* | 6/2006 | Bishop | G06F 17/2229 |
| 2006/0156220 A1* | 7/2006 | Dreystadt | G06F 17/211 715/202 |
| 2006/0190815 A1* | 8/2006 | Jones | G06F 17/2229 715/210 |
| 2006/0206798 A1 | 9/2006 | Kohlmeier et al. | |
| 2006/0218171 A1* | 9/2006 | Wakeam | G06K 9/00409 |
| 2006/0294469 A1* | 12/2006 | Sareen | G06F 17/30038 715/730 |
| 2007/0011608 A1 | 1/2007 | Titemore et al. | |
| 2007/0100829 A1 | 5/2007 | Allen et al. | |
| 2007/0233681 A1* | 10/2007 | Ronen | G06F 8/71 |
| 2007/0239761 A1 | 10/2007 | Baio et al. | |
| 2007/0266309 A1* | 11/2007 | Sellman | G06F 17/2229 715/234 |
| 2007/0300054 A1* | 12/2007 | Lo | G06F 8/30 713/2 |
| 2009/0164941 A1* | 6/2009 | Johnson | G06F 11/3684 715/810 |
| 2009/0249180 A1 | 10/2009 | Cheng | |
| 2009/0300547 A1 | 12/2009 | Bates et al. | |
| 2010/0077290 A1 | 3/2010 | Pueyo | |
| 2010/0082570 A1 | 4/2010 | Altaf et al. | |
| 2011/0029952 A1 | 2/2011 | Harrington | |
| 2011/0078615 A1 | 3/2011 | Bier | |
| 2011/0087516 A1 | 4/2011 | Frieden et al. | |
| 2011/0167332 A1* | 7/2011 | Nickas, Jr. | G06F 17/2264 715/234 |
| 2011/0179049 A1 | 7/2011 | Caldwell et al. | |
| 2011/0238650 A1 | 9/2011 | Jenkins et al. | |
| 2011/0270851 A1 | 11/2011 | Mishina et al. | |
| 2012/0110443 A1 | 5/2012 | Lemonik et al. | |
| 2012/0191716 A1 | 7/2012 | Omoigui | |
| 2012/0290926 A1* | 11/2012 | Kapadia | G06F 17/24 715/255 |
| 2013/0036348 A1 | 2/2013 | Hazard | |
| 2013/0185252 A1 | 7/2013 | Palmucci | |
| 2013/0185622 A1 | 7/2013 | Odean et al. | |
| 2013/0204664 A1 | 8/2013 | Romagnolo et al. | |
| 2014/0143250 A1 | 5/2014 | Martin et al. | |
| 2014/0201331 A1 | 7/2014 | Kershaw et al. | |
| 2014/0279927 A1 | 9/2014 | Constantinescu et al. | |
| 2014/0281850 A1 | 9/2014 | Prakash et al. | |
| 2014/0289645 A1 | 9/2014 | Megiddo et al. | |
| 2015/0161079 A1 | 6/2015 | Grosfeld | |
| 2015/0331914 A1 | 11/2015 | Cherukuri | |
| 2015/0379887 A1 | 12/2015 | Becker et al. | |
| 2016/0134667 A1 | 5/2016 | Suresh et al. | |
| 2016/0285694 A1 | 9/2016 | Maes | |
| 2016/0299976 A1 | 10/2016 | Brunn et al. | |
| 2016/0371259 A1 | 12/2016 | Kohlmeier et al. | |
| 2016/0371352 A1 | 12/2016 | Kohlmeier et al. | |

OTHER PUBLICATIONS

U.S. Appl. No. 14/499,195; Bernhard S.J. Kohlmeier, et al.; "Productivity Tools for Content Authoring"; filed Sep. 28, 2014.
"Document collaboration and Co-Authoring", Retrieved on: Mar. 13, 2015 Available at: https://support.office.com/en-gb/article/Document-collaboration-and-co-authoring-ee1509b4-1f6e-401e-b04a-782d26f564a4?ui=en-US&rs=en-GB&ad=GB.
"Enterprise Content Creation", Retrieved on: Mar. 15, 2015 Available at: http://www.objective.com/products/enterprise-content-creation/collaborative-authoring.
Claims of U.S. Appl. No. 14/729,644; Bernhard S.J. Kohlmeier, et al.; "Graph-Driven Authoring in Productivity Tools"; filed Jun. 3, 2015.
"International Search Report and Written Opinion Issued in PCT Application No. PCT/US2016/038590", dated Sep. 6, 2016, 11 Pages.
"International Preliminary Report on Patentability Issued in PCT Application No. PCT/US2016/038590", dated Sep. 1, 2017, 9 Pages.
"Second Written Opinion Issued in PCT Application No. PCT/US2016/038590", dated May 11, 2017, 8 Pages.
"Final Office Action Issued in U.S. Appl. No. 14/858,894", dated Jul. 12, 2018, 24 Pages.
"Non Final Office Action Issued in U.S. Appl. No. 14/858,894", dated Oct. 18, 2018, 18 Pages.
"Non Final Office Action Issued in U.S. Appl. No. 14/858,894", dated Dec. 1, 2017, 20 Pages.
"Final Office Action Issued in U.S. Appl. No. 14/858,910", dated Jun. 6, 2018, 23 Pages.
"Non Final Office Action Issued in U.S. Appl. No. 14/858,910", dated Sep. 21, 2018, 21 Pages.
"Non Final Office Action Issued in U.S. Appl. No. 14/858,910", dated Oct. 12, 2017, 18 Pages.
Bendersky, et al., "Finding Text Reuse on the Web", In proceedings of Second ACM International Conference on Web Search and Data Mining;, Feb. 9, 2009, 10 Pages.
Edwards, et al., "Timewarp: Techniques for Autonomous Collaboration", In Proceedings of the ACM SIGCHI Conference on Human factors in computing systems, Mar. 22, 1997, 8 Pages.
Mejova, et al., "Reuse in the Wild: An Empirical and Ethnographic Study of Organizational Content Reuse", In Proceedings of the SIGCHI Conference on Human Factors in Computing Systems, May 7, 2011, pp. 2877-2886.
O'Callaghan, et al., "A Strategy Development Process for Enterprise Content Management", In Proceedings of 13th European Conference on Information Systems, Jan. 1, 2005, 13 Pages.

(56) References Cited

OTHER PUBLICATIONS

"International Search Report and Written Opinion Issued in PCT Application No. PCT/US2016/038589", dated Sep. 6, 2016, 13 Pages.

"International Search Report and Written Opinion Issued in PCT Application No. PCT/US2016/038595", dated Sep. 6, 2016, pp. 14.

Viegas, et al., "Studying Cooperation and Conflict Between Authors with History Flow Visualizations", In Proceedings of the SIGCHI Conference on Human Factors in Computing Systems, vol. 6, Issue 1, Apr. 24, 2004, 8 Pages.

* cited by examiner

US 10,394,949 B2

DECONSTRUCTING DOCUMENTS INTO COMPONENT BLOCKS FOR REUSE IN PRODUCTIVITY APPLICATIONS

CROSS-REFERENCE TO RELATED APPLICATION(S)

This application claims the benefit of U.S. Provisional Application Ser. No. 62/182,990, filed Jun. 22, 2015.

BACKGROUND

Productivity applications provide tools and platforms to author and consume content in electronic form, including documents such as, but not limited to, word processing documents, notebook documents, presentation documents, spreadsheet documents, and webpage documents. The electronic format of authoring and consuming content via productivity applications—and in many cases the network communication interfaces of computing systems that enable communication between devices through wired and wireless protocols, provide the unique ability to focus on how to help a user 'write' better content faster.

BRIEF SUMMARY

Techniques and systems for facilitating content authoring are presented. Previously generated content from a same or different author than the user of a productivity application can be reused. The previously generated content can be of a same or different file type than that consumed or generated by the productivity application. To facilitate the content authoring, the collection of documents previously written by the user or others can be transformed into component objects. These objects are then made available for retrieval as well as insertion within a productivity application, allowing authors to reuse these objects without leaving the application or opening a separate file and actively copying a portion and pasting into their current document.

A document shredder is described that transforms a document into component objects. The document shredder may be accessed as a service by a productivity application in order to obtain component objects of a document. The document shredder, in response to receiving a request from a productivity application, obtains a document indicated by the request and applies a parser. The parser comprises logic that understands how an object is represented in a file format of the document, identifies boundaries of the object and any dependent entities of the object in the document, extracts the object and its dependent entities, and generates the component block file with a representation of the object and its dependent entities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques and systems for facilitating content authoring are presented.

Previously generated content from a same or different author than the user of a productivity application can be reused. The previously generated content can be of a same or different file type than that consumed or generated by the productivity application. To facilitate the content authoring, documents can be transformed into component objects compatible with the document format of the productivity application and insertable into the user's document without opening another window of a same or different application.

Reference to "documents" herein refers to files containing consumable content and should not be construed as being limited to the .doc, .docx and related file formats. That is, the term "document" is being broadly used in place of the term "content file" and may be in any suitable file format.

The deconstructing of the documents can be referred to as "document shredding". A goal of a document shredder (a module or software application that performs the document shredding) is to identify the specific objects within a document that are likely to be reused in others ("reusable objects" or "component objects"). Examples of these specific objects include images, visualizations/charts (e.g., as available from certain spreadsheet applications), data tables, slides, and the like. In some cases, a document shredder performs a transformation of content into relevant objects by looking for a set of pre-defined object types within documents of known file format (e.g. Office documents). Once these objects have been identified, the shredder may then replicate and store these objects separately from the source document. The separate storage of these objects can enable the objects to be accessed quickly from the client application without needing to download and open the entire original source file. It should be understood that the separate storing of the objects would be performed as permitted by compliance rules managing privacy and synchronization. For example, in some cases, the objects may be stored for a duration of use of the shredder and then deleted after sending to the source of the request for shredding.

The transformation of the content into the relevant objects may have been performed before or at the time of the request to reuse content from a particular document. The document shredder may be executed at a remote server. The transformation of content into the relevant objects may be performed at certain times on the remote server for later use (or reuse). Then, the productivity application, at the client, can fetch the components in response to a user request to view and/or insert reusable content.

Figure 1:
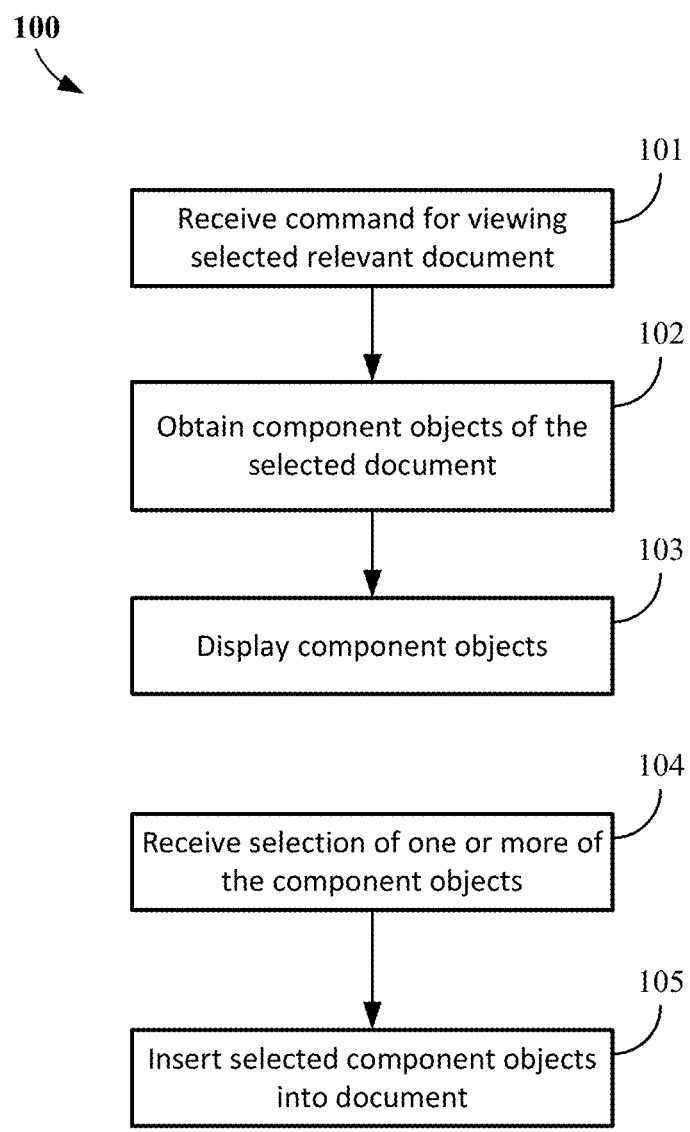
FIG. 1 illustrates an example process flow for a productivity application facilitating content reuse.

FIG. 1 illustrates an example process flow for a productivity application facilitating content reuse. The productivity application can provide an immersive experience for the user so that the user can reuse parts of documents that may be relevant to their work without having to leave the productivity application (and their own document). For example, referring to processes 100 shown in FIG. 1, in response to receiving an indication of selection of a document for viewing within the productivity application (101), the productivity application can obtain component objects of the selected document (102). Here, the viewing of the document is referring to previewing for possible insertion of content from the document, for example in a pane or menu, and not the case where the document is being opened using the productivity application such as in the case where a file is selected for opening from within a productivity application.

The step 102 of obtaining component objects of the selected document can involve transforming selected relevant document content into the component objects. In some cases, the transformation can be accomplished at the client/productivity application by, for example, parsing the content of the document for identifiable object blocks. In some cases, the step 102 of obtaining component objects of the selected document can involve requesting the component objects for the document from a service and receiving the component objects from the service. The service can include a document shredder. The document shredder can transform documents into component blocks (a file of an instance of a component object). Indeed, in response to a request of a client or at some earlier time, the document shredder can transform content of a source document into specific component objects that may be inserted into a user's document.

Figure 2:
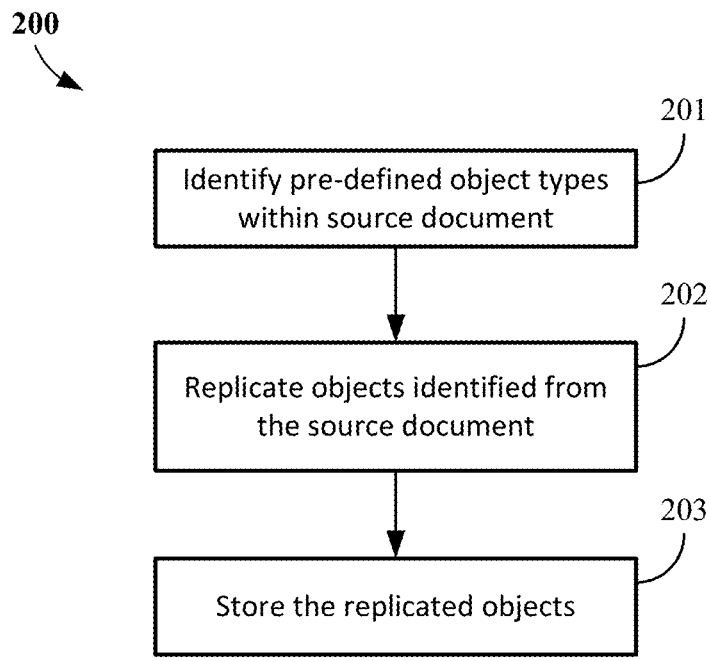
FIG. 2 illustrates an example process that may be carried out by a document shredder.

FIG. 2 illustrates an example process that may be carried out by a document shredder. Referring to FIG. 2, the document shredder can identify pre-defined object types within a source document (201). The pre-defined object types can depend on the type of document, its content, and/or format. In addition, the granularity of the pre-defined object types may vary depending on implementation. There is generally some logical atomic piece for a type of document. The "atomic" nature of the piece refers to those units or objects from content of another document that would or could be wholesale reused without needing to be further split. For example, presentation documents can include pre-defined object types indicating a slide, a title, a footer, an image, and the like. Spreadsheet documents can include pre-defined object types indicating graphs, data tables, and/or groupings of cells. Word processing documents may not have as many obvious structures indicated by the document; however, there can exist a number of objects such as graph, paragraph, header, image, equation, and table.

In any case, the document shredder may include additional functionality for identifying portions of text using keywords, key phrase and/or topic detection to identify sections of the text that can relate to the context of the user's document. Indeed, in some cases, text blocks can be extracted that provide definitions for terms, for example, an author may have included the text "an acquisition is a process where one business entity subsumes another," which can be extracted and saved as part of a repository of term-definitions that can be easily quoted by others. The reusable object here is text, but it wasn't identified via any simple heuristics. Thus instead of, or in addition to, identifying pre-defined object types within the source document, the document shredder can identify topics or definitions in text in the source document and save a copy of the text directed to that topic as an identifiable object block for later reuse.

For example, the content of a document can be analyzed to identify entities, topics, and key phrase extractions. The key phrase extraction may be trained on a public and/or private corpus. The content in the document may contain various entries, such as text, words, strings, numbers, symbols, images and the like. An entry may be recognizable as an entity based on various characteristics. The analysis of the document can include searching for recognizable entities and/or domains, for example by named entity recognizers and dictionary look-ups. A domain is a category for a series of entities (or items). For example, a domain may be books. An entity refers to a concept (person, organization, location, service, temporal, numeric, monetary etc.) that a document (or other file) is discussing or describing. In the book domain example, they entity may be a specific book. The aspects are the properties or attributes of the entity that are mentioned about the entity and which may be of interest to the user. In the case of a book as an entity, the genre or the premise/plot are examples of the aspects. It should be understood that the term "entity" should not be restricted to specific named entities and may refer to broad concepts such as "sales data" or "pitch deck".

A topic is a distribution of words and that can correspond to an aspect of an entity (and sometimes the entity itself). A topic serves as a subject or category of related information. The topic of an expression can be used for entity disambiguation (e.g., using Latent Dirichlet Allocation (LDA) and its hierarchical variants). Entity disambiguation refers to the identifying of entities from text and their labeling with one of several entity type labels. In some cases, Wikipedia may be used as a comprehensive reference catalog for large-scale entity disambiguation. In other cases, other public and/or private corpus can be used to facilitate the entity disambiguation.

The identification of portions of text as component objects may be supplemented by identifying certain objects in the document such as paragraph or section or change in font.

Returning to FIG. 2, the pre-defined object types that are identified in the source document can be replicated (202) and stored separately from the source document as shredded component objects for a particular source document (203). The identification and replication can be performed by a "parser" that understands the file type of the source document and can extract a component object. A parser includes logic that understands a document format and, particularly, how individual objects are represented in the document format. Furthermore, in addition to identifying boundaries of an object from the data in a file, the parser identifies dependent entities of the object that may be located at different parts of the file. For example, in a spreadsheet application, the parser for the spreadsheet file type identifies, for a table, any data of cells outside the table that are referenced by the table and extracts those data with the table so that a component object can be replicated without missing content.

The document shredder can generate a component block file that includes the component object and its dependent entities (the combination of component object and its dependent entities may be referred to herein as simply a component object for sake of brevity). The component block file can be in any number of file formats. In some cases, an image file format may be generated for use as a preview of the object and/or for use by clients that do not support the file format of the component block file (or one of the file formats that the component block file can be converted to).

In some cases, the shredded component objects (in component block files) are stored on a same storage system as the source document itself. In other cases, the shredded component objects are stored on a separate storage system. The shredded component objects may be stored in this manner for later retrieval in response to a request of a productivity application or other client. Of course, certain implementations of the document shredder can involve an on-demand feature where the source document is shredded into component objects at the time of the request to obtain the component objects.

Advantageously, because the productivity application can obtain component objects of the document (either because of functionality provided at the client or by being provided the component objects via a service), the results can be document type and application agnostic. That is, the productivity application enables the user to reuse content from a variety of content and application types (file types). A "file type" or "file format type" refers to the different file formats available for encoding information for storage in a computer file. Examples of file types for "documents" include publishing document file formats, word processing document file formats, graphics file formats, presentation document file formats, spreadsheet document file formats, and webpage document file formats.

Returning to FIG. 1, once the component objects are obtained (e.g., from a manifest received by the productivity application), these component objects (in the form of a preview image instance or an object format instance) can be displayed within the productivity application (103). In some cases, the component objects can be displayed in a form that represents the content being inserted, for example in a manner similar to the variety of available objects that are depicted for insertion via an "insert" menu in many productivity applications. Thus, the displayed object can also function as a graphical representation of a command to insert the object so that in response to receiving a selection of one or more of the displayed component objects (104), the productivity application can insert the component object(s) into the document (105). An example of a process by which the component block file of a selected displayed component object is obtained by the productivity application is described with respect to FIG. 10.

In some implementations, the productivity application can include intelligence to facilitate the insertion of the component objects within the existing layout. For example, once the productivity application receives a command to insert/import a component object (or block) into the user's document, the component object can be transformed into an existing format and style. For example, inserting into a Word document can transform a component object into a format of the active Word document.

Figure 3:
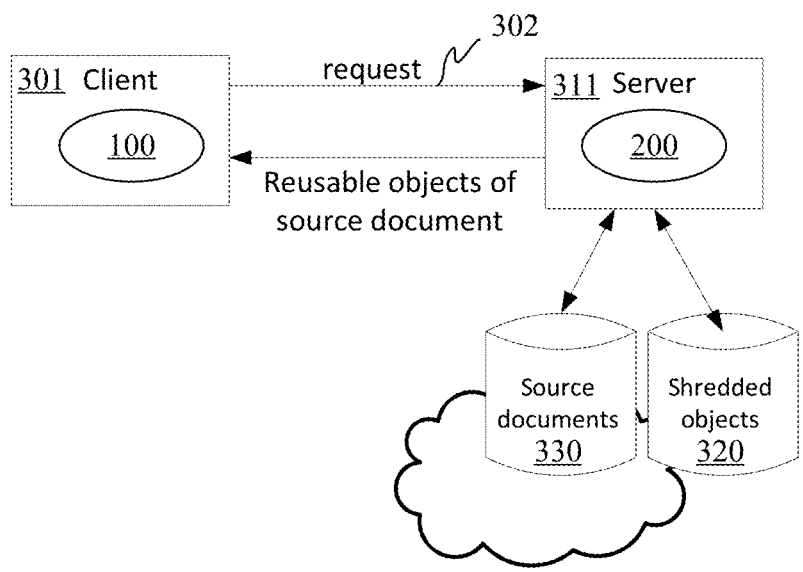
FIG. 3 illustrates an example operating environment.

FIG. 3 illustrates an example operating environment. Referring to FIG. 3, a client 301 executing process 100 may send a request 302 to a server 311. In response to receiving the request 302, the server 311 can retrieve from shredded objects storage 320 the appropriate reusable objects of a source document identified by the request and transmit the reusable objects of source document 322 to the client 301. Server 311 can execute process 200 upon receipt of the request 302. In some cases, server 311 may execute process 200 at a time prior to the request 302 so that content from source documents can be transformed into the appropriate reusable objects and stored in the shredded objects storage 320. The source documents may be obtained from a source documents storage 330.

The source documents storage 330 may be located on the server 311, on a connected enterprise server, as part of cloud storage, etc. Similarly, the shredded objects storage 320 may be located on the server 311, on a connected enterprise server, as part of cloud storage, etc. Although source document storage and shredded objects storage are shown as separate, implementations are not limited thereto and the source documents and shredded objects may be stored as a whole or in part on a same storage device or system. Moreover, not all source documents may be stored at a same storage location. In some cases, the source documents may be stored at various locations at both local and remote locations (and even on the client device). In one case where the source document is at the client device, the client 301 can send the document to the server 311 with the request 302.

In some cases, the server 311 first sends a manifest of reusable objects for a document indicated in the request 302. The manifest may include thumbnail images of the reusable objects and then, in response to a subsequent communication between the client 301 and the server 311 that includes an indication of one or more selections from the available reusable objects, the server 311 can provide the reusable object files to the client 301. The manifest can provide a ranked list of the reusable objects, where the objects are ranked based on any of a variety of purposes including, but not limited to, relevancy to context, relevancy to key words, and relevancy to a specified request of the user.

Figure 4A:
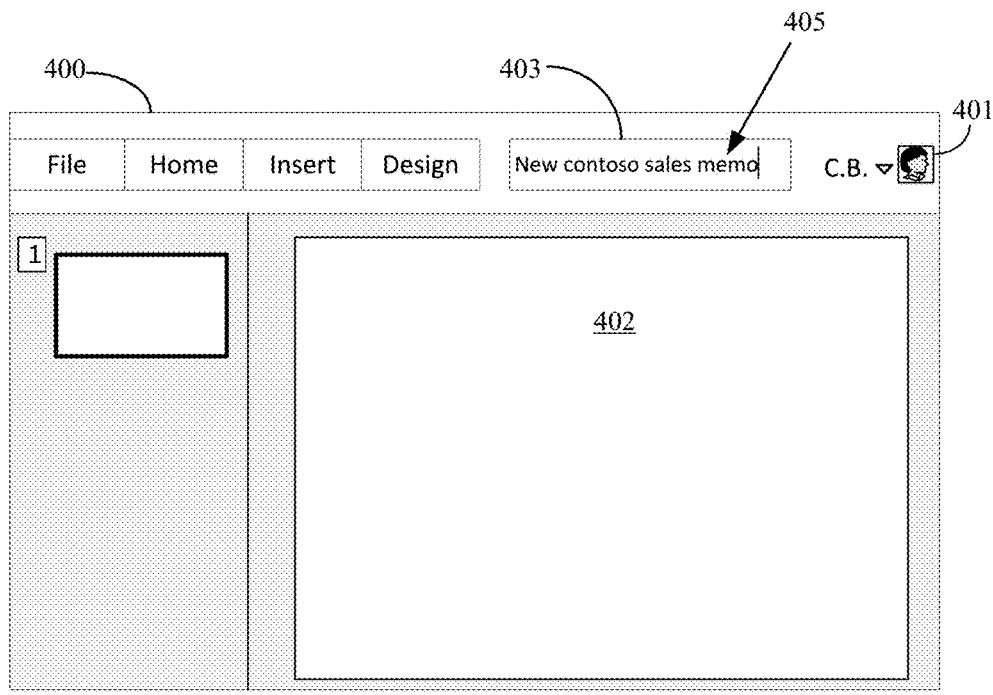
FIGS. 4A-4I illustrate a graphical user interface and corresponding actions taken by a productivity application to facilitate content reuse.

FIGS. 4A-4I illustrate a graphical user interface and corresponding actions taken by a productivity application to facilitate content reuse. Referring to FIG. 4A, in a graphical user interface 400 of a presentation productivity application, an initial state may be a blank or new presentation (e.g., a default state for a "new" document). For this illustrative scenario, the user, C.B. 401, of the presentation productivity application is writing a new Contoso company sales memo on a presentation slide 402. The graphical user interface for the presentation productivity application can include a search bar 403 providing an input field for a user to make a request to the productivity application or express some form of intent for using the productivity application. The search bar 403 can receive the user's expression/request via a typing keyboard, a touch keyboard or display, a motion gesture, a touch gesture, a stylus (e.g., "inking"), head, eye and gaze tracking, brain activity, or voice input. In some cases, the input field can be provided as part of a menu, tool bar, task bar/pane, or other graphical user interface element located on a same or different visual display as a content authoring surface of a productivity application. Although specific implementations are described with respect to graphical user interfaces, it should be understood that natural user interface (NUI) components may be used in addition to or in place of graphical user interface components.

Figure 4B:
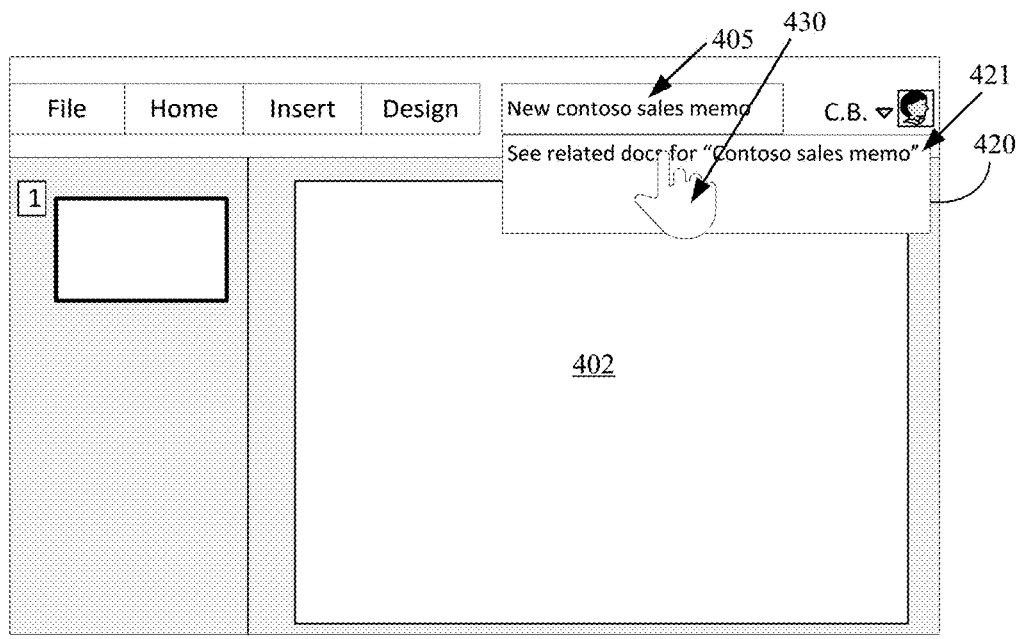

In this example case, the user inputs "New contoso sales memo" 405 in the input field of the search bar 403. The input of such a phrase may be sufficient as a command to obtain relevant documents or a separate command such as via selection of an icon, voice input, gestural or touch input and the like may initiate a process by the productivity application for obtaining relevant documents. For example, a drop down menu 420 can provide a number of actions available to the user, including a selection of seeing related documents 421, which may be selected (430) as shown in FIG. 4B in order to initiate a command for the productivity application to request relevant enterprise content. Since there is no content in the presentation document to obtain context, the terms input to the search bar 403 (along with possibly some other context) may be used to generate the request to the service.

After the request for documents has been sent to the service, the productivity application receives ranked relevant documents from the service and these results can be presented to the user, for example in an information pane 440 of the productivity application graphical user interface 400. It should be further understood that the process may be initiated without an explicit user query (e.g., by an expression input to the search box or highlighted from the content in the document). For instance, a user may be able to directly access the information pane 440 while in the middle of their authoring process. The application may then generate a set of relevant results based on the content that is in the document at the time of the user's access of the information pane 440.

Figure 4C:
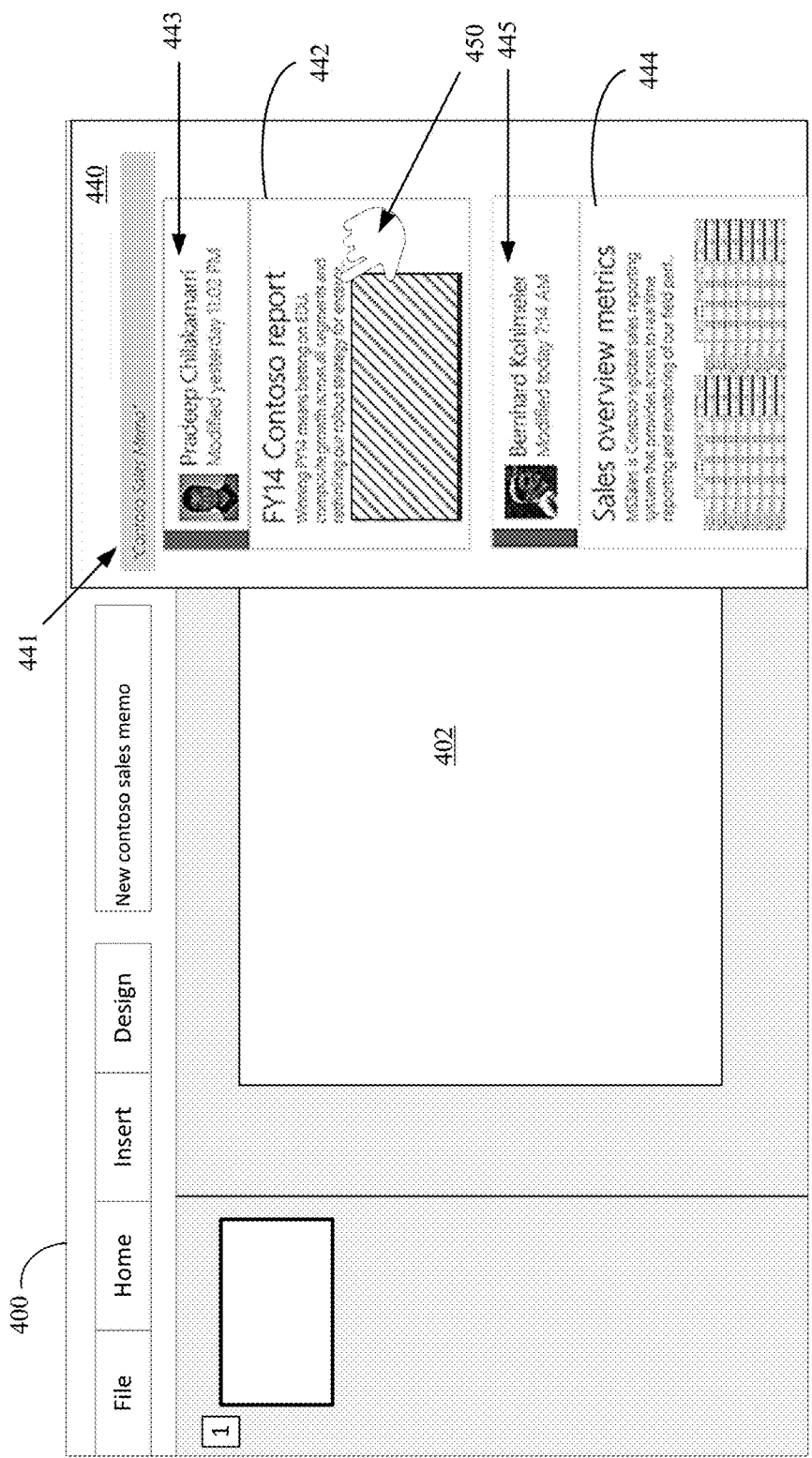

In the example illustrated in FIG. 4C, the information pane 440 indicates the topic 441 for the results and lists the identified ranked results that were returned by the service. Here, two documents are shown, one presentation document 442 from Pradeep 443 and one spread sheet document 444 from Bernhard 445. These results may have been selected by the service based on the relationship of Pradeep and Bernhard to the user C.B. combined with the relevancy of the documents to "Contoso Sales Memo". The results may be based on an enterprise graph.

From the information pane 440 of FIG. 4C, the user may select (450) the FY14 Contoso report 442. The productivity application then provides an immersive experience for inserting relevant content.

Figure 4D:
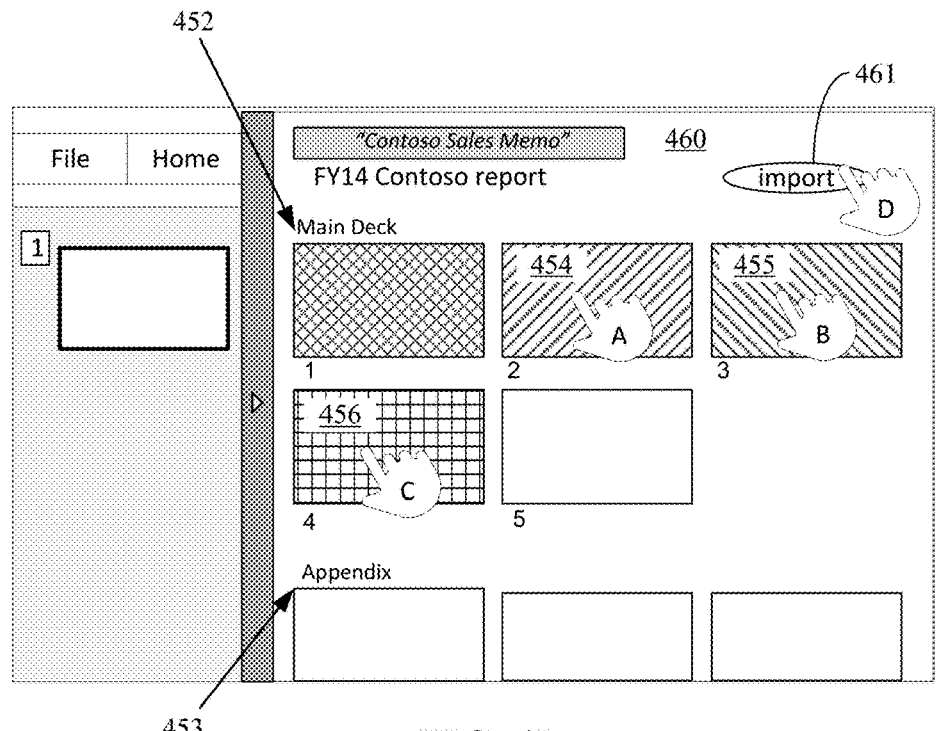
Figure 4E:
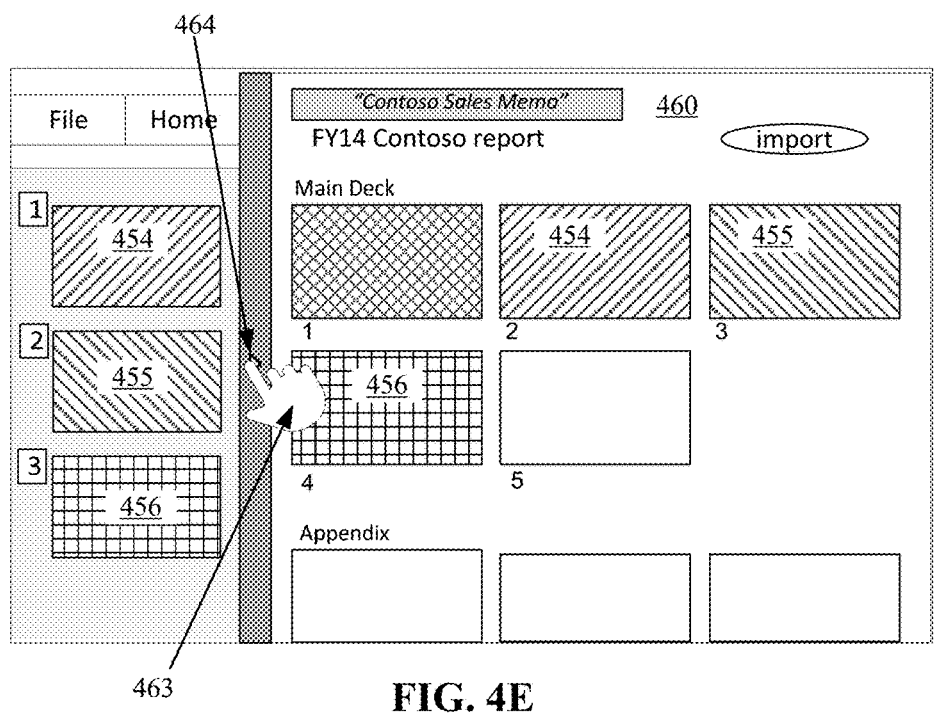

For example, as shown in FIG. 4D, after the user selects the report 442, instead of this action opening the document, the productivity application obtains component objects of the document that can be selected via a selection field 460. In the example illustrated in FIG. 4D, the productivity application can transform, request already transformed, or have transformed (by a remote document shredder) the presentation document of the FY14 Contoso report 442 into component objects of individual slides and even identify the slides from the main portion 452 and the appendix 453 of the report 442. The user can easily select the component objects presented in the selection field 460 and reuse those objects in their own document without leaving the productivity application. For example, the user can select slides 454, 455, and 456 (with operations A, B, and C, respectively) and then indicate that these slides are to be included in their own document by operation D selecting the command to import the objects 461.

The transforming of the report 442 into component objects of slides is a useful approach for presentation documents; however, this type of granularity (e.g., entire slide) may vary depending on implementation as well as the type of document, its content, and/or format. There is generally some logical atomic piece for a type of document and such pieces may be presented in the form of selectable component objects in the selection field 460. For example, in a spread sheet document, the component objects may include graphs, data tables, and/or groupings of cells.

Figure 4F:
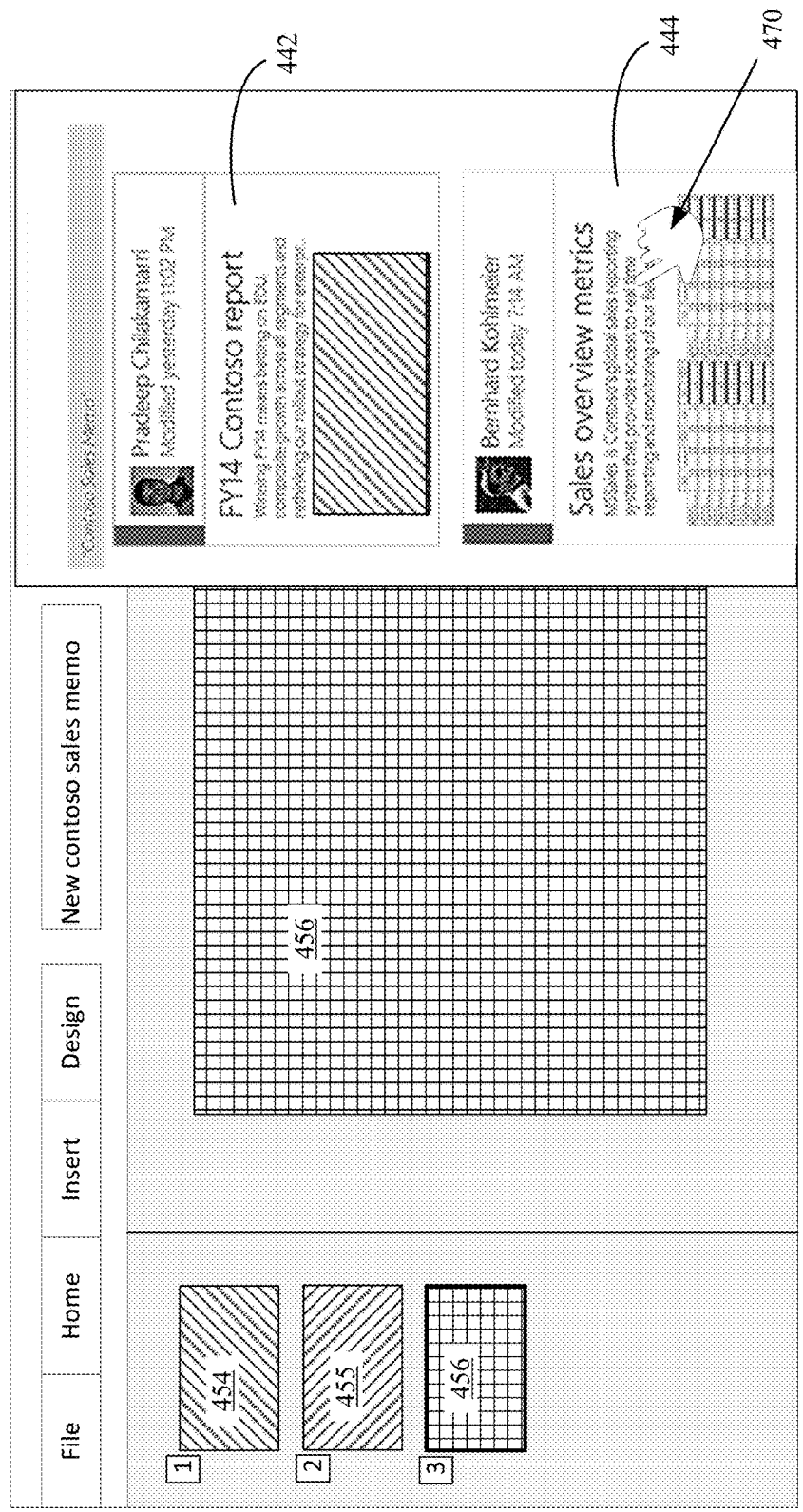
Figure 4G:
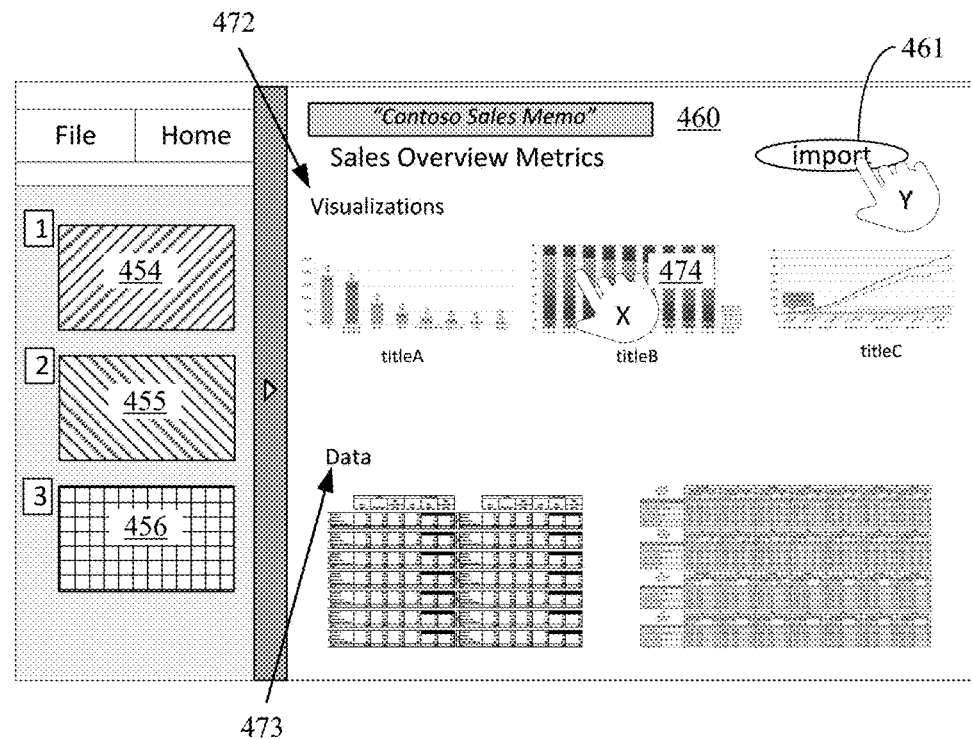
Figure 4H:
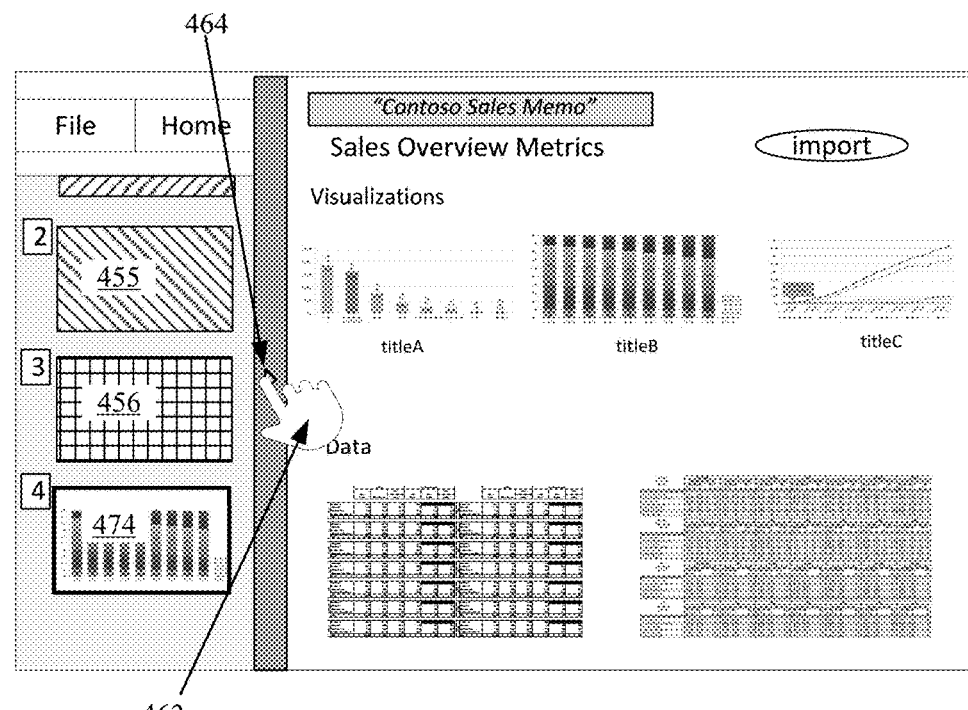

The spread sheet example is shown in FIGS. 4F-4H. Before illustrating the spread sheet example, in FIG. 4E, it can be seen that after the slides 454, 455, and 456 are imported into the user's document, the user can return to the information pane 440 from the selection field by closing the selection field 460, for example by selecting (463) an icon 464 to exit the selection field 460. Of course, this is illustrative of just one example graphical user interface feature for returning to a prior state and should not be construed as limiting.

As shown in FIG. 4F, the selection pane is closed and the information pane is shown with the ranked results of the Contoso report 442 and the Sales overview metrics 444. Here, the user may decide to select (470) the Sales overview metrics 444.

Then, as shown in FIG. 4G, the productivity application obtains the component objects of the document 444 and transforms the information pane 440 into a selection field 460. In the example illustrated in FIG. 4G, the productivity application can transform, request already transformed, or have transformed (by a remote document shredder) presentation document of the Sales overview metrics 444 into component objects of visualizations 472 and the appendix 473 of the spread sheet 444. The user can easily select the component objects presented in the selection field 460 and reuse those objects in their own document without leaving the productivity application. For example, the user can select visualizations graph 474 (with operation X) and then indicate that this object is to be included in their own document by operation Y selecting the command to import the objects 461.

Figure 4I:
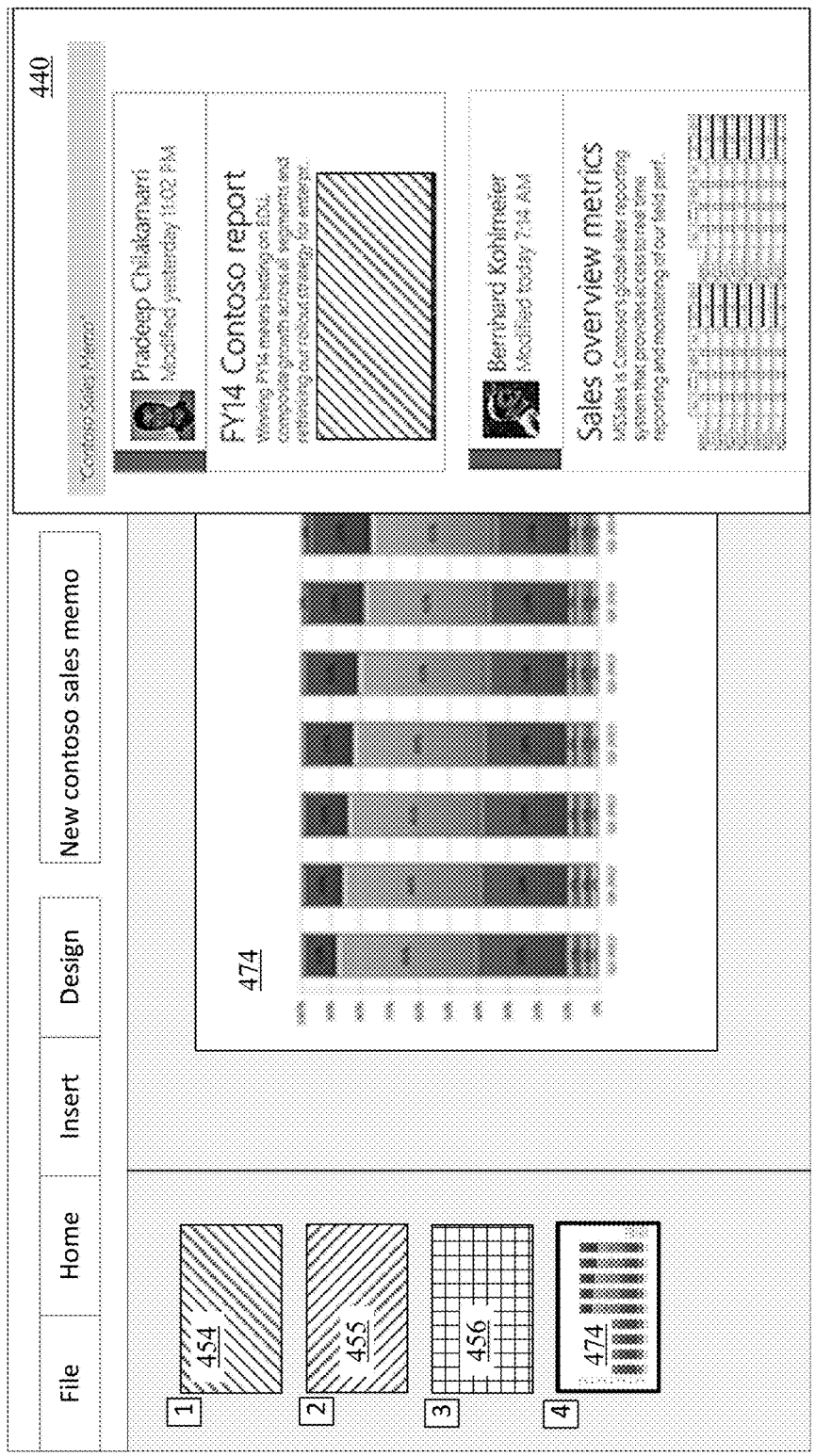

When the user is done, as shown in FIG. 4H, it can be seen that after the graph 474 is imported into the user's document, the user can return to the information pane 440 from the selection field by closing the selection field 460, for example by selecting (463) an icon 464 to exit the selection field 460. Then, as shown in FIG. 4I, the user can return to the information pane 440 (which can then also be closed).

Figure 5:
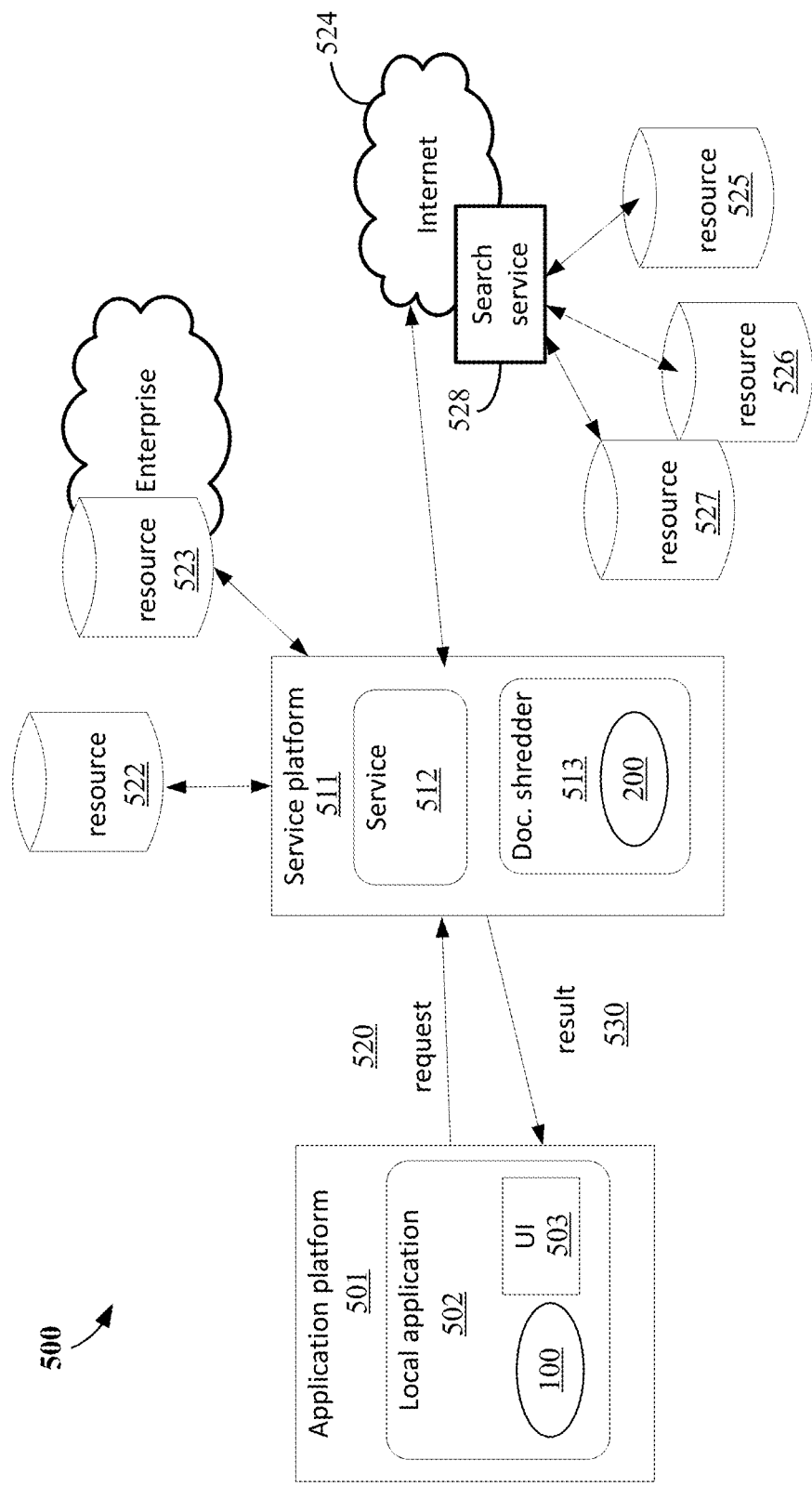
FIG. 5 illustrates an operating environment that can support the example implementation of FIGS. 4A-4I.

FIG. 5 illustrates an operating environment that can support the example implementation of FIGS. 4A-4I. Referring to FIG. 5, operating environment 500 may be involve a service architecture with an application platform 501 and a service platform 511. Local application 502 is executed within the context of application platform 501, while service 512 is hosted by and runs within the context of service platform 511.

Local application 502 is representative of any software application, module, component, or collection thereof, capable of implementing a graphical user interface 503 such as graphical user interfaces 400 (and corresponding productivity applications) and performing processes described with respect to FIGS. 4A-4I including processes 100. Examples of applications in which the described techniques may be provided include, but are not limited to, word processing applications, spreadsheet applications, presentation applications, web browsers, email applications, blogging and micro-blogging applications, social networking applications, and gaming applications. Indeed, the described techniques are suitable for a variety of productivity applications.

Examples of productivity applications include the Microsoft Office® suite of applications from Microsoft Corp., including Microsoft Word®, Microsoft Excel®, Microsoft PowerPoint®, as well as the web application components thereof, all registered trademarks of Microsoft Corp.; Google Docs (and Google Drive™); the Apache OpenOffice™ available from the Apache Software Foundation; the LibreOffice® suite of applications available from The Document Foundation, registered trademarks of The Document Foundation; and the Apple iWork® suite of applications from Apple Inc., including Apple Pages®, Apple Keynote®, and Apple Numbers®, all registered trademarks of Apple Inc.

The term "productivity application" may in some cases by synonymous with "content authoring application" or "content authoring tool". Since the described systems and techniques focus on applications and tools through which content is being authored, there is no distinction intended between these terms and such terms may be used interchangeably herein.

Local application 502 may be a browser-based application that executes in the context of a browser application. In some implementations, local application 502 may execute in the context of or in association with a web page, web site, web service, or the like. However, local application 502 may also be a locally installed and executed application, a streamed application, a mobile application, or any combination or variation thereof. Local application 502 may be implemented as a standalone application or may be distributed across multiple applications.

Figure 6:
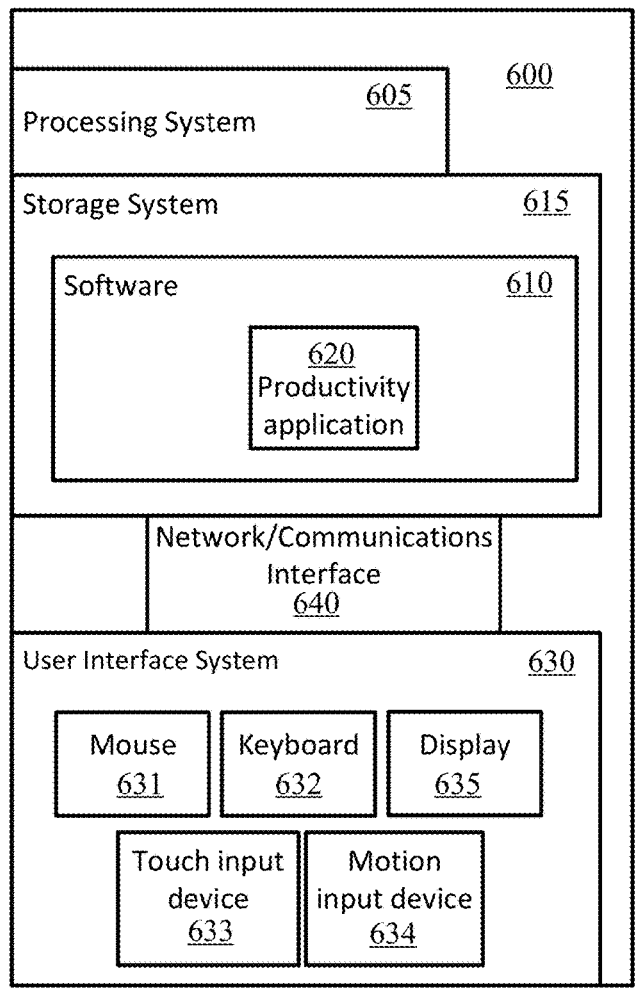
FIG. 6 illustrates components of a computing device that may be used in certain implementations described herein.

Application platform 501 with local application 502 can represent a client computing device with a productivity application providing an authoring experience as described herein. Application platform 501 is representative of any physical or virtual computing system, device, or collection thereof capable of hosting local application 502 (and capable of employing processes 100 described with respect to FIG. 1). Examples include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing system 600 illustrated in FIG. 6 is representative.

Service platform 511 with service 512 can represent the service that carries out the queries of a graph on behalf of the productivity application in order to provide relevant documents (and/or component objects) to the user of the productivity application in response to a request 520 communicated to the service 512 by the application platform 501. Service platform 511 may also include a document shredder 513 (that can carry out processes 200).

Service platform 511 can host, be integrated with, or be in communication with enterprise resources 522 (including cloud-based resources 523) such as contacts databases, Active Directory database, file storage, and the like. Example resources include, but are not limited to Microsoft SharePoint, Microsoft OneDrive, and Dropbox. Service 512 and/or document shredder 513 may also be able to carry out a search of and/or retrieve content from resources local to the application platform 501. In some cases, service platform 511 can further be in communication with Internet resources 524 such as resources 525, 526, and 527 available through a search service 527, containing, for example, web sites, web pages, contacts databases, Active Directory database, lists, maps, accounts, and the like.

Service 512 can carry out processes to search the available resources for relevant documents (and in some cases other content) based on the user and the content (having identifiable entity and topic) provided from the productivity application (as well as the date) and provide results 530 to the local application 502. Service 512 may be able to search (with permission) any database that contains content that a user may want to reuse. Similarly, Document shredder 513 can carry out document shredding processes for documents identified by service 512 and/or local application 502 and provide results 530 to the local application 502.

Figure 7:
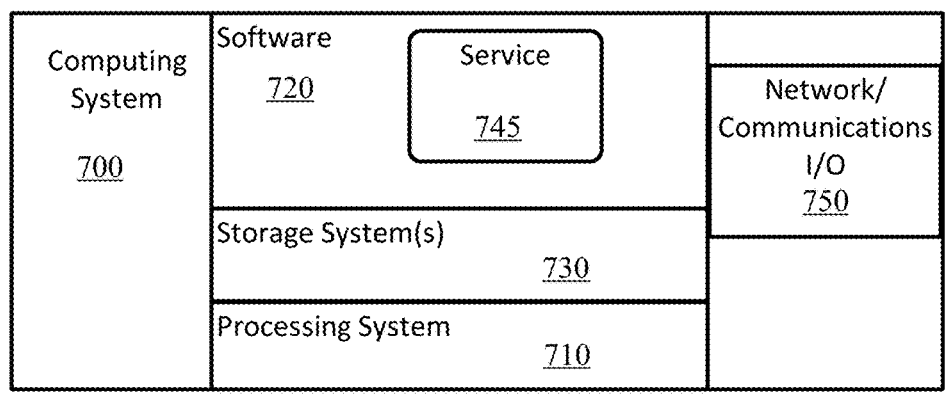
FIG. 7 illustrates components of a computing system that may be used to implement certain methods and services described herein.

Service platform 511 is representative of any physical or virtual computing system, device, or collection thereof capable of hosting all or a portion of service 512. Examples of service platform 511 include, but are not limited to, web servers, application servers, rack servers, blade servers, virtual machine servers, or tower servers, as well as any other type of computing system, of which computing system 700 of FIG. 7 is representative. In some scenarios, service platform 511 may be implemented in a data center, a virtual data center, or some other suitable facility. In some cases, service platform 511 may be implemented similarly to computing system 600.

In some cases, local application 502 may be considered remote from service 512 and/or document shredder 513 in that each are implemented on separate computing platforms. In such situations, local application 502 and service 512 and/or document shredder 513 may communicate by way of data and information exchanged between application platform 501 and service platform 511 over a suitable communication link or links (not shown). In other cases, the features and functionality provided by local application 502 and service 512 and/or document shredder 513 can be co-located or even integrated as a single application.

FIG. 6 illustrates components of a computing device that may be used in certain implementations described herein; and FIG. 7 illustrates components of a computing system that may be used to implement certain methods and services described herein.

Referring to FIG. 6, system 600 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 600 may be incorporated to implement a particular computing device.

System 600 includes a processing system 605 of one or more processors to transform or manipulate data according to the instructions of software 610 stored on a storage system 615. Examples of processors of the processing system 605 include general purpose central processing units, application specific processors, and logic devices, as well as any other type of processing device, combinations, or variations thereof. The processing system 605 may be, or is included in, a system-on-chip (SoC) along with one or more other components such as network connectivity components, sensors, video display components.

The software 610 can include an operating system and application programs such as a productivity application 620 providing an authoring experience such as described herein. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 6, can be thought of as additional, nested groupings within the operating system space, each containing an OS, application programs, and application programming interfaces (APIs).

Storage system 615 may comprise any computer readable storage media readable by the processing system 605 and capable of storing software 610 including the productivity application 620.

Storage system 615 may include volatile and nonvolatile, removable and non-removable media implemented in any method or technology for storage of information, such as computer readable instructions, data structures, program modules, or other data. Examples of storage media of storage system 615 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a propagated signal or carrier wave and any reference herein to "computer readable storage media" and "computer readable storage medium" should not be interpreted as a propagated signal.

Storage system 615 may be implemented as a single storage device but may also be implemented across multiple storage devices or sub-systems co-located or distributed relative to each other. Storage system 615 may include additional elements, such as a controller, capable of communicating with processing system 605.

Software 610 may be implemented in program instructions and among other functions may, when executed by system 600 in general or processing system 605 in particular, direct system 600 or the one or more processors of processing system 605 to operate as described herein.

In general, software may, when loaded into processing system 605 and executed, transform computing system 600 overall from a general-purpose computing system into a special-purpose computing system customized to retrieve and process the information for facilitating content authoring as described herein for each implementation. Indeed, encoding software on storage system 615 may transform the physical structure of storage system 615. The specific transformation of the physical structure may depend on various factors in different implementations of this description. Examples of such factors may include, but are not limited to the technology used to implement the storage media of storage system 615 and whether the computer-storage media are characterized as primary or secondary storage.

The system can further include user interface system 630, which may include input/output (I/O) devices and components that enable communication between a user and the system 600. User interface system 630 can include input devices such as a mouse 631, track pad (not shown), keyboard 632, a touch device 633 for receiving a touch gesture from a user, a motion input device 634 for detecting non-touch gestures and other motions by a user, a microphone for detecting speech (not shown), and other types of input devices and their associated processing elements capable of receiving user input.

The user interface system 630 may also include output devices such as display screen(s) 635, speakers (not shown), haptic devices for tactile feedback (not shown), and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display 635 in myriad ways, presenting graphical user interface elements, text, images, video, notifications, virtual buttons, virtual keyboards, or any other type of information capable of being depicted in visual form.

The user interface system 630 may also include user interface software and associated software (e.g., for graphics chips and input devices) executed by the OS in support of the various user input and output devices. The associated software assists the OS in communicating user interface hardware events to application programs using defined mechanisms. The user interface system 630 including user interface software may support a graphical user interface, a natural user interface, or any other type of user interface. For example, the interfaces for the productivity application and/or the productivity tool for assisted content authoring (and corresponding functionality) described herein may be presented through user interface system 630.

Communications interface 640 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 600 is generally intended to represent a computing system with which software is deployed and executed in order to implement an application, component, or service for a productivity tool as described herein. In some cases, aspects of computing system 600 may also represent a computing system on which software may be staged and from where software may be distributed, transported, downloaded, or otherwise provided to yet another computing system for deployment and execution, or yet additional distribution.

Certain aspects described herein, such as those carried out at service platform 511 may be performed on a system such as shown in FIG. 7. Referring to FIG. 7, system 700 may be implemented within a single computing device or distributed across multiple computing devices or sub-systems that cooperate in executing program instructions. The system 700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 700 can include a processing system 710, which may include one or more processors and/or other circuitry that retrieves and executes software 720 from storage system 730. Processing system 710 may be implemented within a single processing device but may also be distributed across multiple processing devices or sub-systems that cooperate in executing program instructions.

Storage system(s) 730 can include any computer readable storage media readable by processing system 710 and capable of storing software 720. Storage system 730 may be implemented as a single storage device but may also be implemented across multiple storage devices or sub-systems co-located or distributed relative to each other. Storage system 730 may include additional elements, such as a controller, capable of communicating with processing system 710. As mentioned above, any reference herein to "computer readable storage media" and "computer readable storage medium" should not be interpreted as a propagated signal.

Software 720 may be implemented in program instructions and among other functions may, when executed by system 700 in general or processing system 710 in particular, direct the system 700 or processing system 710 to operate as described herein for a document shredder 745.

In some cases, an application programming interface (API) can be provided that enables aspects of the document shredder to be available to other systems, services, and/or clients.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic.

The API-calling component may be a local component (i.e., on the same data processing system as the API-implementing component) or a remote component (i.e., on a different data processing system from the API-implementing component) that communicates with the API-implementing component through the API over a network. An API is commonly implemented over the Internet such that it consists of a set of Hypertext Transfer Protocol (HTTP) request messages and a specified format or structure for response messages according to a REST (Representational state transfer) or SOAP (Simple Object Access Protocol) architecture. Here, a productivity application (e.g., 620) may connect to a document shredder service (e.g., 745) over the Internet using APIs structured using the REST or SOAP protocols.

System 700 may represent any computing system on which software 720 may be staged and from where software 720 may be distributed, transported, downloaded, or otherwise provided to yet another computing system for deployment and execution, or yet additional distribution.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 750 may be included, providing communication connections and devices that allow for communication between system 700 and other computing systems (not shown) over a communication network or collection of networks (not shown) or the air.

Figure 8A:
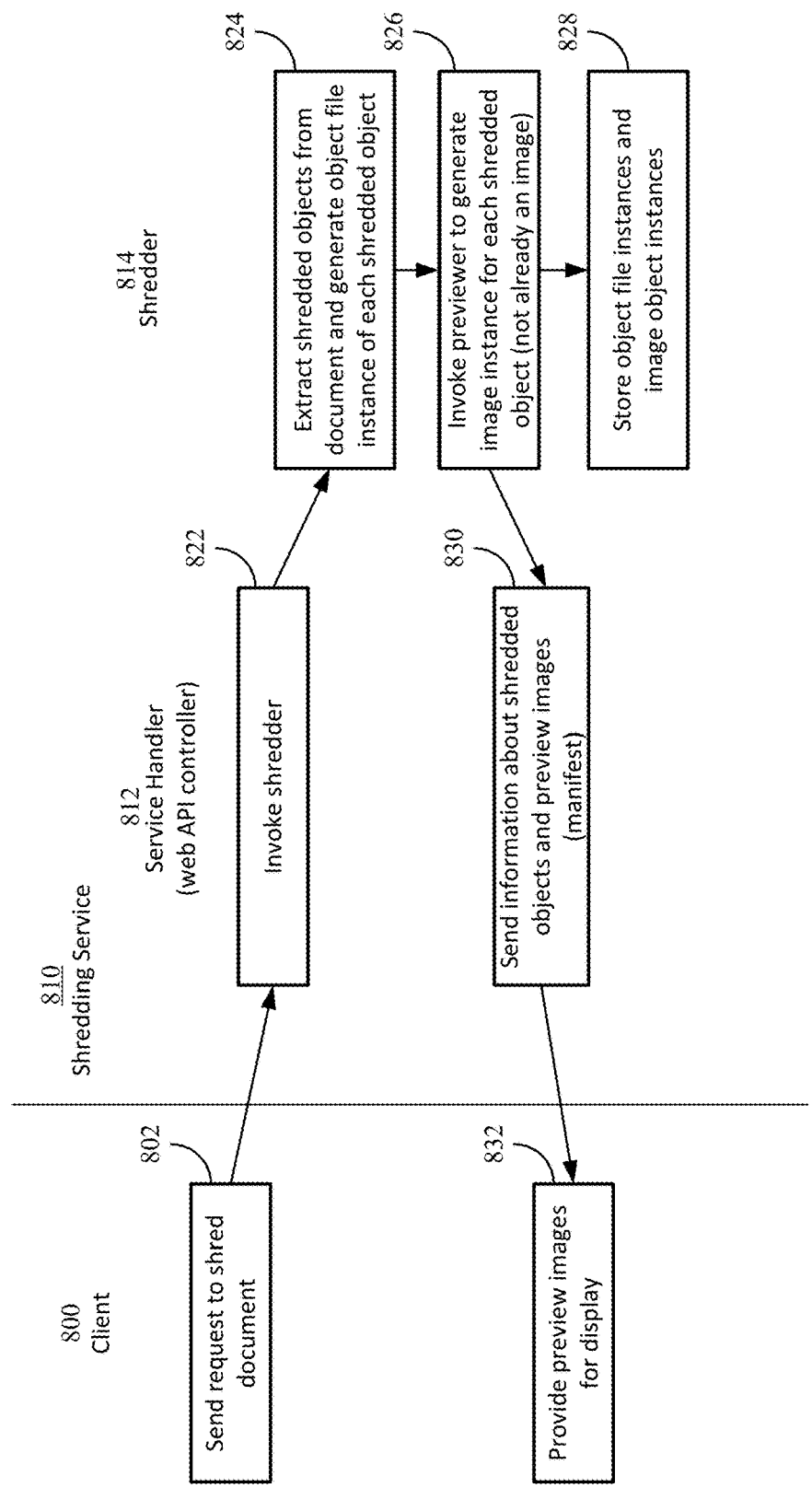
FIG. 8A illustrates a simplified workflow of a shredding service.
Figure 8B:
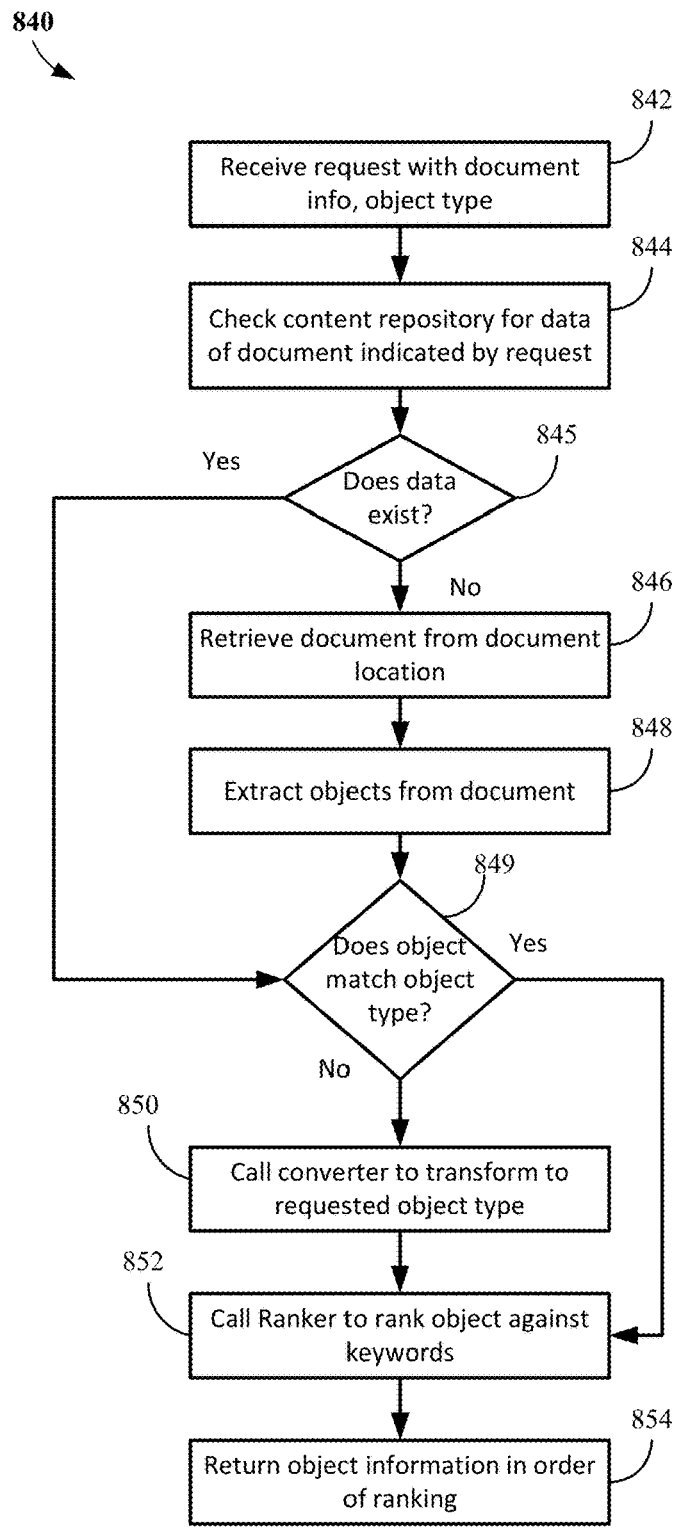
FIG. 8B illustrates a more detailed example of the process flow at a shredder in one implementation.
Figure 9:
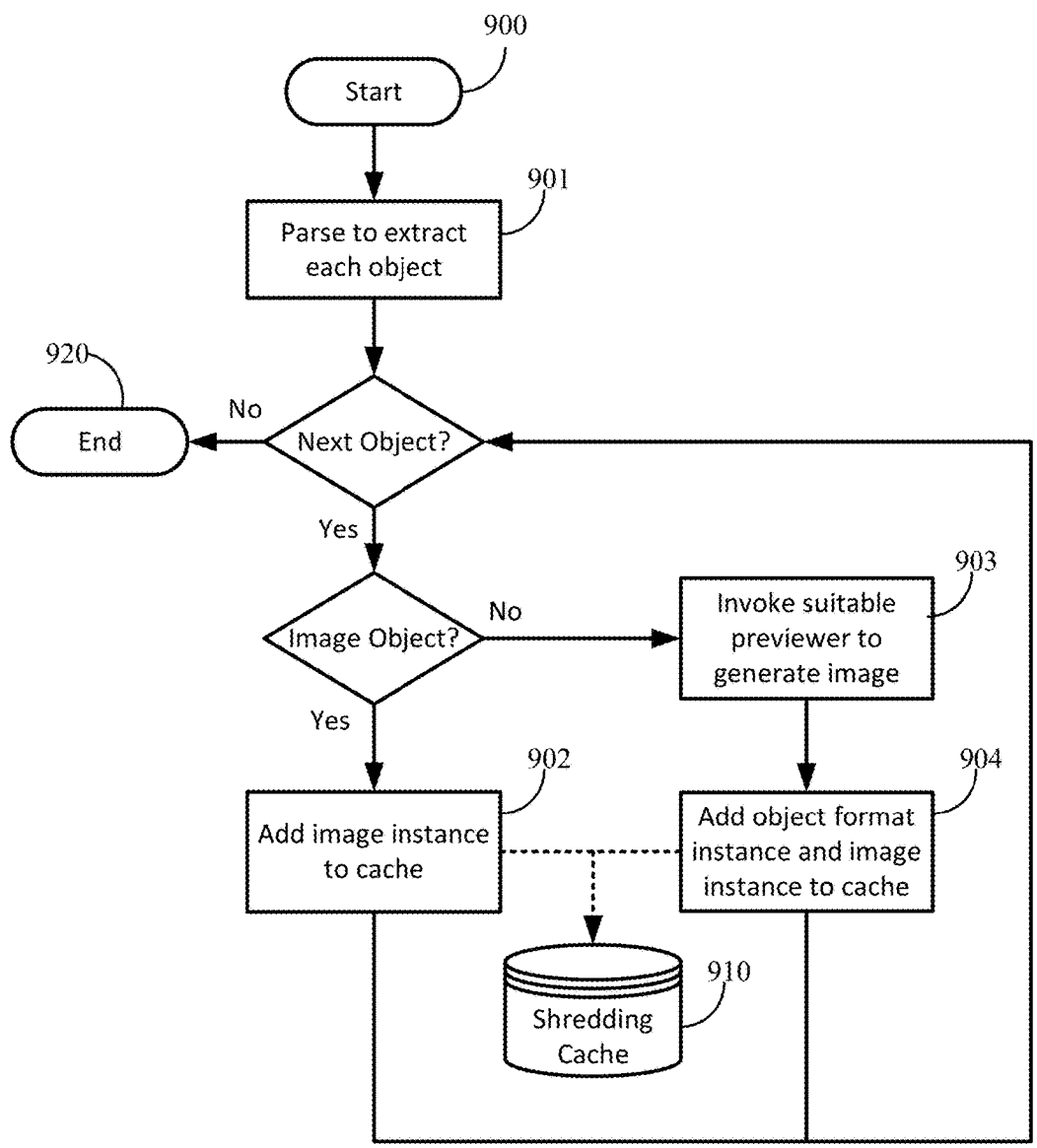
FIG. 9 illustrates a workflow of an example shredder.
Figure 10:
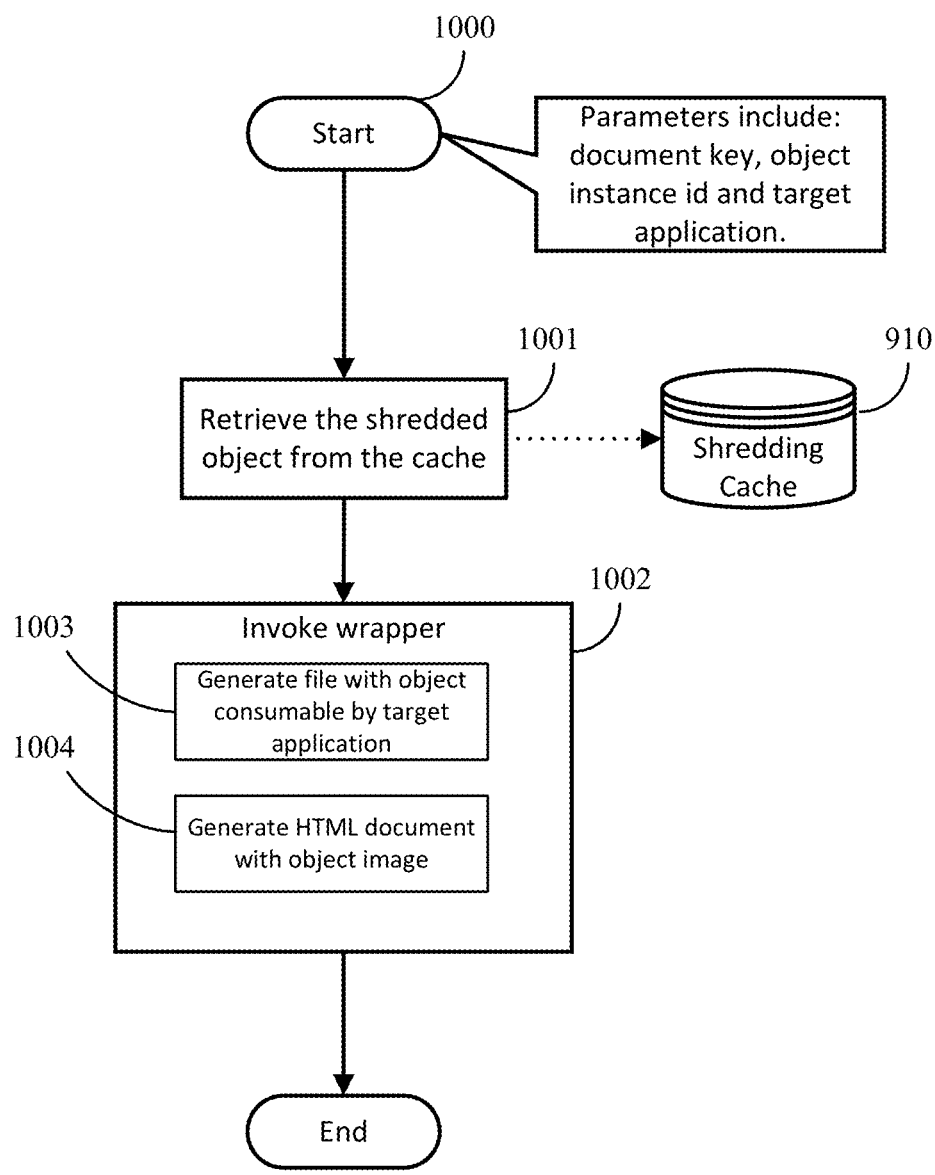
FIG. 10 illustrates a workflow of the service processing the request to get a shredded object.

Some examples of implementing a document shredder for deconstructing documents into component blocks for reuse in productivity applications are provided with respect to FIGS. 8-10. In the example implementation of a service that deconstructs documents into component blocks for reuse in productivity applications, a web API controller provides entry points for client requests. Here, the web API controller can handle both a "shred document" request and a "get shredded object" request.

A shredded object is an object extracted from a document. For each extracted object of a document, a preview image can also be generated. Both the original extracted object and the preview image can be stored in a transient cache of a separate-from-document-store shredder or returned to a document store from which the document was retrieved for a document management system with integrated shredder, so when other users request on the same document, the shredding operation can be avoided and the data in the cache (or at the document store) can be served directly.

The shredded object can be stored (e.g., in the transient cache) as one or more instances. For example, one instance can be the original format of the document (e.g., for a Word document the format may be OpenXML format). Another instance, for example, can be an image format. The image format instance can be used to preview a shredded object, or, in some cases, may be used for importing when the original format of the document is not compatible with the user's productivity application. For example, to import a table from a Word document into PowerPoint, the image instance may be used if PowerPoint does not recognize the OpenXML schema for the table.

A simplified workflow of a shredding service, particularly the shred document request, is illustrated in FIG. 8A. Referring to FIG. 8A, Client 800 sends a request (802) to the shredding service 810 to shred a document. The shredding service 810 can include a service handler 812—the web API controller—and a shredder 814. This document may be stored locally at the client, at a shared repository, in a user's account in cloud storage, or other storage location. The request from the client 800 can include a token that enables the shredding service (e.g., via a web API controller) to access the document on behalf of the user and retrieve the document. In an example implementation, the document is stored in a content database (document store) managed by a document management system (such as available from Amazon Web Services, Microsoft SharePoint, Citrix ShareFile and the like). The request to the API from the Client can include the following parameters: document path (e.g., the URL) or a document key (which may be used in a subsequent request from a client for the same document), target application (e.g., the application that will consume the shredding result), and candidate types and formats (e.g., the types of objects the client will accept and the format of the files).

Upon receipt of the request from the client, the web API controller 812 can invoke the shredder (822). The shredder 814 shreds the document data by extracting shredded objects from the document and generates the object file instance of each shredded object (824). During shredding, the shredder 814 can invoke a previewer to generate preview images for each extracted object (that is not already an image) (826). The previewer is used to generate the image instance for each shredded object. The shredder can store the object file instances and the image instances (828). The web API controller 812 sends information about shredded objects and preview images back to client 800 (830) (e.g., as a manifest).

The response from the shredding service 810 (e.g., in operation 830) can include the document's shredding manifest as items are shredded. For example, the response can include a document key and an array of shredded objects (where for each object, the object type and object instances are included). An object instance Id can be part of the manifest from the service to the client and used by the client to retrieve data of an object instance. In one implementation, the shredding manifest may be defined with a structure having a token of the document (a randomly generated GUID for security), the shredded objects of the document, the shredded object type, the instances of the shredded object, the Id of the shredded object instance, the format of the shredded object instance and even a field that indicates if there is more data. The client 800 can provide preview images for display (832). On the user interface side, the user may see objects as they become available (and in some cases, popping up continuously) while the user is still able to operate on existing objects in the graphical user interface. This way a user does not have to wait for the entire document to be processed before seeing anything in the graphical user interface.

At the shredder 814, a transient cache component can be used to cache shredded objects and preview images. Next time, when the same document is requested, data will be retrieved directly from the cache. The transient cache has an expiration according to compliance requirements so any data held in the cache is deleted according to the expiration rules. In some cases, where the shredder is integrated with the document store and not a separate entity, the cache can be implemented with storage associated with the document store (and the manifest may be stored separately from the streams for shredded objects and their previews/images). Thus, the use of a transient cache component is based on whether the shredder is implemented by a document store (e.g., as a custom HTTP handler deployed inside a file management server) or as an independent service. Where there is a cache, the cache can be expired (and the content deleted) when there is no more activity on a document.

FIG. 8B illustrates a more detailed example of the process flow at a shredder in one implementation. A shredder, such as shredder 814, can perform process 840 during operation 824. Referring to FIG. 8B, process 840 can begin with receiving (842) the request with document information and object type. The document information can be used to identify the document, for example as a document Id or a URL. The shredder can check (844) if data of the document exists in the content repository (e.g., the transient cache or other storage location that stores shredded objects). A determination (845) can be made regarding whether the data exists. If the data does not exist in the content repository, then the shredder can retrieve (846) the document from the document location identified by the document Id or URL and extract (848) objects from the document. The shredder can save the objects back to the content repository.

Once the objects are extracted or retrieved from the repository in the case that the data exists in the repository (as determined in operation 845), a determination (849), whether the object has an appropriate object type format. If the object does not match the requested object type, the shredder calls (850) a converter to transform the object to the requested object type. For example, if an HTML format is requested, the shredder may call the converter to convert the object into HTML format. As another example, when converting between two Microsoft Office applications, the shredder may call the converter (or a specified transformer) to convert the shredded object's original OpenXML data into the OpenXML data for the target application.

In some cases, the shredder can call (852) a ranker to rank the object against any keywords that the client provides. The ranking may be carried out by a service associated with an enterprise graph. The calling of the ranker may occur before, in parallel with, or after calling the converter to convert any objects that do not match the requested object type. After ranking and converting (if needed), the shredder can return object information in order of ranking, and the information for each object can include all formats that the client requests.

The shredding method such as described above creates a shredding task and return. The shredding task extracts each shredded object from the original document, and based on the object type, different operations will be conducted. The results are stored into the shredding cache (e.g., transient cache or storage associated with the document storage). FIG. 9 illustrates a workflow of an example shredder. Referring to FIG. 9, the process flow begins 900 with the shredder parsing to extract each object of a file (901). As each object is shredded (extracted) it is stored in the shredding cache 910 until there are no more next objects from the parser and the shredding ends 920. For an extracted object, if the extracted object is an image object, then an image instance is added (902) to the cache 910. If the extracted object is not an image object, a suitable previewer is invoked to generate an image instance (903). The previewer is able to render the file format of the extracted object and therefore there may be a number of previewers for the shredder service so that a suitable previewer can be found for the particular file format of the document and/or object. Both the image instance generated by the previewer and an object format instance are added (904) to the cache 910. The object format instance can be in the format of the original document or in some other consumable format. For example, OpenXML may be used for an object extracted from a Word or PowerPoint file. Not shown in the process flow is the response from the service to the client.

The client can retrieve data of a particular shredded object instance via a get shredded object API. In the example implementation, the request parameters can include the document key, the object instance id of the shredded object instance that was in the response of the shred document request, and the target application. The response of a successful request is the data stream of the object instance. FIG. 10 illustrates a workflow of the service processing the request to get a shredded object. Referring to FIG. 10, the process flow begins 1000 with the receipt of a request that can include a document key, object instance id and target application. The service can use this information to retrieve (1001) the identified shredded object from the cache 910, and then invoke a wrapper (1002) to generate a file for sending a data stream or image stream to the client. A wrapper can generate the appropriate file/document from the shredded object instance for providing to the client. In some cases, the wrapper can generate a file with object consumable by the target application (1003) and generate an HTML document with an object image (1004) for a case where the object file format is not consumable by the target application. The HTML solution is useful to render and import cross-application and cross-platform content. HTML can provide a baseline so file formats not supported by a client can still be shredded and their shredded objects provided to the client.

An example implementation supporting the productivity application experience shown in FIGS. 4A-4I utilizes an enterprise graph to rank the shredded objects (and/or to identify the documents to be shredded). For example, the productivity application client may query a search API of a document store to get a document list. The search API may collaborate with an enterprise graph to get back the most relevant documents. When a user selects a document, the client can query the shredding service to get shredded objects of the document. In this case, a workflow for the shredder may be as follows.

Retrieve document data from the document store and if no manifest exists for that document or the manifest indicates that the shredding result is not up to date: shred the document; save the shredded objects and the document shredding manifest back to the content database at the document store; request the enterprise graph (e.g., a service associated with the enterprise graph) to rank the shredded objects based on user context, and send the ranked list of shredded objects to the client. If needed communicate to the enterprise graph that objects have been created (or, when a previous shredded object no longer exists, that the shredded object should be deleted); and send the list of shredded objects to the client. If the manifest exists and is up to date when the shredder retrieves document data from the document store, the shredder can retrieve the shredded objects from the content database (of the document store); request the enterprise graph (e.g., a service associated with the enterprise graph) to rank the shredded objects based on user context, and then send the ranked list of shredded objects to the client.

At the client, the client may render the shredded objects for a user to preview and when a user selects a shredded object, the client can insert the object into the current document. The client may send a signal to the enterprise graph to indicate the object being inserted.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), SoC systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for deconstructing documents for ease of authoring content in productivity applications, comprising:
   a processing system; and
   a document shredder stored on one or more computer-readable storage media, the document shredder directing the processing system to:
   receive a request for reusable components of a source document, wherein the source document is authored by a first user and selected by a second user;
   in response to receiving the request for reusable components of the source document;
   obtain the source document;
   apply a parser to transform content of the source document into reusable component blocks, wherein the parser comprises logic that understands how an object is represented in a file format of the source document, identifies boundaries of the object and any dependent entities of the object in the source document, extracts the object and its dependent entities, and generates a component block file for the reusable component block with a representation of the object and its dependent entities;
   replicate the reusable component blocks;
   store the reusable component blocks separate from the source document;
   communicate to an enterprise graph to add the reusable component blocks to the enterprise graph to indicate a relationship between the source document and the reusable component blocks, wherein the enterprise graph indicates a relationship between the first user and the second user; and
   provide at least one of the reusable component blocks to a source of the request.

2. The system of claim 1, further comprising a transient cache in which the reusable component blocks are stored.

3. The system of claim 1, wherein the document shredder further directs the processing system to provide the component block file to a source of the request for reusable components of the source document in response to receiving the request for reusable components of the source document.

4. The system of claim 1, wherein the document shredder further directs the processing system to, in response to receiving the request for reusable components of the source document, generate a manifest including a list of the reusable component blocks; and provide the manifest to a source of the request.

5. The system of claim 4, wherein the document shredder directs the processing system to provide a component block file to the source of the request in response to receiving an indication of a selected reusable component block from the list of the reusable component blocks provided in the manifest.

6. The system of claim 1, wherein the document shredder further directs the processing system identify text blocks directed to a particular topic within the source document; replicate any identified text blocks; and store the identified text blocks separately from the source document.

7. A method for facilitating content authoring in productivity applications, the method comprising:
receiving an indication of a selected document authored by a first user and selected by a second user from a set of ranked results of reusable content provided to a productivity application, wherein the set of ranked results are based on an enterprise graph;
in response to receiving the indication of the selected document, obtaining component objects sourced from the selected document and displaying the component objects in a selection field within the productivity application;
in response to receiving an indication of one or more selected component objects via the selection field, inserting the one or more selected component objects into a document of the second user; and
sending an indication to the enterprise graph that the one or more selected component objects were inserted into the document, the indication being to update the enterprise graph to indicate a relationship between the second user and the selected document or the one or more selected component objects, wherein the enterprise graph indicates a relationship between the first user and the second user.

8. The method of claim 7, wherein the set of ranked results comprises documents of at least two file types.

9. The method of claim 7, wherein obtaining component objects sourced from the selected document comprises:
transforming content of the selected document into component objects by applying a parser, wherein the parser comprises logic that understands how an object is represented in a file format of the selected document, identifies boundaries of the object and any dependent entities of the object in the selected document, extracts the object and its dependent entities, and generates the component objects from a representation of the object and its dependent entities.

10. The method of claim 7, wherein obtaining component objects sourced from the selected document comprises:
requesting the component objects for the selected document from a service providing a document shredder; and
receiving the component objects in an image format from the service.

11. The method of claim 10, wherein in response to receiving the indication of the one or more selected component objects via the selection field, the method further comprising:
requesting an object format instance of the one or more selected component objects from the service providing the document shredder; and
receiving the one or more selected component objects in the object format instance from the document shredder.

12. The method of claim 11, wherein a file format of the object format instance is different than a file format of a file type of the selected document.

13. The method of claim 10, wherein inserting the one or more selected component objects into the document of the second user comprises inserting at least one of the one or more selected component objects in the image format into the document.

14. One or more computer readable storage media having instructions stored thereon that when executed by a processing system, direct the processing system to:
display a graphical user interface for a productivity application;
communicate a request for relevant documents for reuse;
receive ranked results identifying the relevant documents for reuse;
in response to receiving the ranked results identifying the relevant documents for reuse, display a representation of one or more of the relevant documents in an information pane of the graphical user interface, wherein the ranked results are based on an enterprise graph;
in response to receiving, via the information pane of the graphical user interface, an indication of a selection by a second user of one of the one or more of the relevant documents, automatically shred the one of the one or more of the relevant documents to obtain component objects sourced from the one of the one or more of the relevant documents and display the component objects in a selection pane of the graphical user interface, the one of the one or more of the relevant documents being authored by a first user;
replicate the component objects;
store the component objects separate from the one of the one or more of the relevant documents; and
communicate to the enterprise graph to add the component objects to the enterprise graph to indicate a relationship between the one of the one or more of the relevant documents and the component objects, wherein the enterprise graph indicates a relationship between the first user and the second user.

15. The media of claim 14, wherein the instructions that direct the processing system to obtain the component objects sourced from the one of the one or more relevant documents direct the processing system to communicate a request to get the component objects from a remote server, the request at least comprising a target application indicating the productivity application.

16. The media of claim 14, wherein the instructions that direct the processing system to automatically shred the one of the one or more of the relevant documents to obtain the component objects sourced from the one of the one or more relevant documents direct the processing system to transform content of the one of the one or more relevant documents into component objects by applying a parser, wherein the parser comprises logic that understands how an object is represented in a file format of the one of the one or more relevant documents, identifies boundaries of the object and any dependent entities of the object in the one of the one or more relevant documents, extracts the object and its dependent entities, and generates the component objects from a representation of the object and its dependent entities.

17. The media of claim 14, wherein the relevant documents comprise documents of at least two file types.

18. The media of claim 14, further comprising instructions stored thereon that when executed by the processing system, direct the processing system to:

in response to receiving an indication to import a selected one or more of the component objects in the selection pane of the graphical user interface, insert the selected one or more of the component objects into a document opened with the productivity application; and send an indication to the enterprise graph that the selected one or more of the component objects were inserted into the document, the indication being to update the enterprise graph to indicate a relationship between the second user and the one of the one or more of the relevant documents or the selected one or more of the component objects.

19. The media of claim 18, further comprising instructions stored thereon that when executed by the processing system, direct the processing system to, in response to receiving the indication to import the selected one or more of the component objects in the selection pane of the graphical user interface, further:

request an object format instance of the selected one or more of the component objects from a service providing the component objects; and receive the selected one or more of the component objects in the object format instance from the service, the selected one or more of the component objects being inserted in the object format into the document.

20. The system of claim 1, wherein the source document is a spreadsheet document, the object is a table, and the dependent entities comprise data of cells outside the table that are referenced by the table.

21. The system of claim 1, wherein the source document is a presentation document and the object is a slide.

* * * * *